(12) United States Patent
Hayashi et al.

(10) Patent No.: US 11,456,094 B2
(45) Date of Patent: Sep. 27, 2022

(54) SURFACE-MOUNTED RESISTOR

(71) Applicant: KOA CORPORATION, Ina (JP)

(72) Inventors: Daigo Hayashi, Ina (JP); Jun Ito, Ina (JP); Yuko Tezuka, Ina (JP)

(73) Assignee: KOA CORPORATION, Ina (JP)

( * ) Notice: Subject to any disclaimer, the term of this patent is extended or adjusted under 35 U.S.C. 154(b) by 0 days.

(21) Appl. No.: 17/176,274

(22) Filed: Feb. 16, 2021

(65) Prior Publication Data

US 2021/0280343 A1 Sep. 9, 2021

(30) Foreign Application Priority Data

Mar. 3, 2020 (JP) .............................. JP2020-035637

(51) Int. Cl.
*H01C 17/00* (2006.01)
*H01C 1/014* (2006.01)
*H01C 1/144* (2006.01)

(52) U.S. Cl.
CPC ........... *H01C 17/006* (2013.01); *H01C 1/014* (2013.01); *H01C 1/144* (2013.01)

(58) Field of Classification Search
CPC ....... H01C 17/006; H01C 1/014; H01C 1/144
See application file for complete search history.

(56) References Cited

U.S. PATENT DOCUMENTS

| | | | | |
|---|---|---|---|---|
| 4,158,218 A * | 6/1979 | McLaurin | ............ | H05K 3/3426 361/308.1 |
| 5,041,696 A * | 8/1991 | Utner | ..................... | H01G 2/065 174/562 |
| 5,739,743 A * | 4/1998 | Mazzochette | ........ | H05K 3/3442 338/313 |
| 6,288,887 B1 * | 9/2001 | Yoshida | ............... | H05K 3/3426 361/306.1 |
| 6,515,844 B1 * | 2/2003 | Moriwaki | .............. | H01G 2/065 361/306.1 |
| 6,820,324 B2 * | 11/2004 | Matsumoto | ............ | H01C 1/144 29/613 |
| 2003/0201871 A1 * | 10/2003 | Chern | .................... | H01C 1/084 338/309 |
| 2008/0094169 A1 * | 4/2008 | Kinoshita | .............. | H01C 7/003 338/309 |
| 2008/0218306 A1 * | 9/2008 | Tamaki | ..................... | H01C 1/14 338/309 |
| 2009/0212900 A1 * | 8/2009 | Szwarc | ................... | H01C 17/28 338/320 |

FOREIGN PATENT DOCUMENTS

| JP | 3-203701 A | 8/1996 |
|---|---|---|
| JP | 2012-004538 A | 1/2012 |

\* cited by examiner

*Primary Examiner* — Kyung S Lee
(74) *Attorney, Agent, or Firm* — WHDA, LLP

(57) ABSTRACT

A highly reliable surface-mounted resistor, which prevents a problem of disconnection between an electrode and a terminal of a chip resistor when heating during mounting, is disclosed. The surface-mounted resistor includes a chip resistor comprising a plate-shaped substrate, a resistance body formed on an upper surface of the substrate, and an electrode connected the resistance body and drawn from the upper surface of the substrate to a lower surface via an end surface, a plate-shaped lead terminal connected to the electrode of the chip resistor, the plate-shaped lead terminal being fixed to the electrode of the substrate on the lower surface side, and an exterior member covering an entire chip resistor and a part of the lead terminal.

3 Claims, 7 Drawing Sheets

US 11,456,094 B2

SURFACE-MOUNTED RESISTOR

CROSS REFERENCE TO RELATED APPLICATION

This document claims priority to Japanese Patent Application Number 2020-035637 filed Mar. 3, 2020, the entire contents of which are hereby incorporated by reference.

BACKGROUND

A chip resistor in which a resistance body such as ruthenium oxide is arranged on a substrate such as alumina, electrodes connected to the resistance body are arranged at both ends of the substrate, and the resistance body is coated with a protective film is conventionally and widely known. Typical structural examples of the chip resistor are described, for example, in FIGS. 7A, 7B and 8 and a paragraph 0002 of Japanese laid-open patent publication No. H8-203701.

Japanese laid-open patent publication No. 2012-004538 discloses a surface-mounted resistor including a chip resistor having the structure shown in FIG. 13. In this structure, upper-surface electrodes 23A arranged at both ends of a ceramic substrate 21 of the chip resistor are fixed to lower surfaces of uppermost parts 30A of Z-shaped terminals 30 by soldering 40 or the like (Symbols are adapted to embodiments, which will be described below and is different from the original text).

The structure is such that the chip resistor is suspended from upper parts of the terminals 30 mounted on a printed substrate or the like. According to the surface-mounted resistor, it is possible to relieve stress due to thermal expansion and contraction caused by a difference in linear expansion coefficient between the ceramic substrate and the printed substrate when a temperature change is repeated.

However, the upper-surface electrodes 23A of the chip resistor are fixed to the upper parts 30A of the terminals 30 by soldering 40 or the like. Therefore, when lower parts 30B of the terminals 30 are soldered to a joint position on the printed substrate during mounting, there is a concern that the upper parts 30A of the terminals 30 and the upper-surface electrode 23A of the chip resistor may be disconnected due to stress caused by a difference in linear expansion coefficient between the ceramic substrate and the printed substrate.

SUMMARY OF THE INVENTION

Therefore, there is provided a highly reliable surface-mounted resistor that prevents a problem of disconnection of an electrode of a chip resistor and a terminal when heating during mounting or the like.

Embodiments, which will be described below, relate to a surface-mounted resistor mounted on printed substrate or the like, and in particular to surface-mounted resistor with a built-in chip resistor.

A surface-mounted resistor of an embodiment comprises: a chip resistor comprising a plate-shaped substrate, a resistance body formed on an upper surface of the substrate, and an electrode connected the resistance body and drawn from the upper surface of the substrate to a lower surface via an end surface; a plate-shaped lead terminal connected to the electrode, the lead terminal being fixed to the electrode of the substrate on the lower surface side; and an exterior member covering an entire chip resistor and a part of the lead terminal.

According to an embodiment, the joint portion between the electrode and the lead terminal of the chip resistor is firmly fixed by the exterior member which is a mold resin. Therefore, even if the stress generated by a difference in linear expansion coefficient is applied when a lower part of the lead terminal is soldered to the joint portion on the printed substrate during mounting, it is possible to prevent the chip resistor and the lead terminal from coming off.

BRIEF DESCRIPTION OF THE DRAWINGS

FIGS. 7A and 7B are views showing a stage of processing a lead frame into a comb shape;

DESCRIPTION OF EMBODIMENTS

Figure 1:
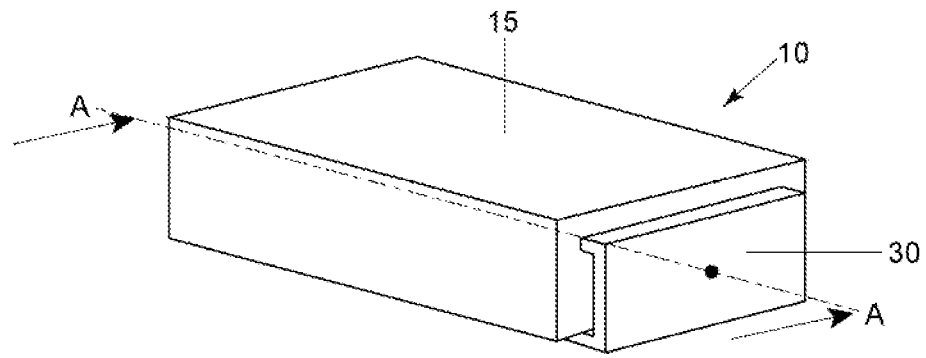
FIG. 1 is a perspective view showing an external shape of a surface-mounted resistor of a first embodiment.

Embodiments will be described with reference to FIGS. 1 to 12. In each drawing, the same or corresponding members or elements will be described with the same reference numerals.

Figure 2:
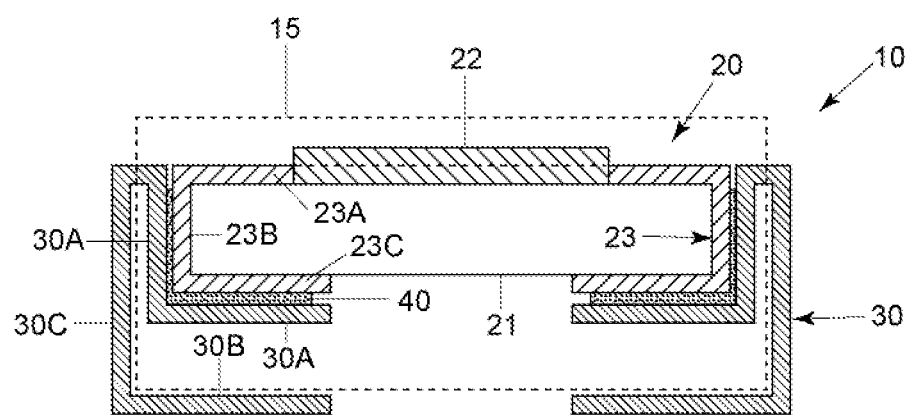
FIG. 2 is a cross sectional view showing the surface-mounted resistor taken along a line AA of FIG. 1.
Figure 3:
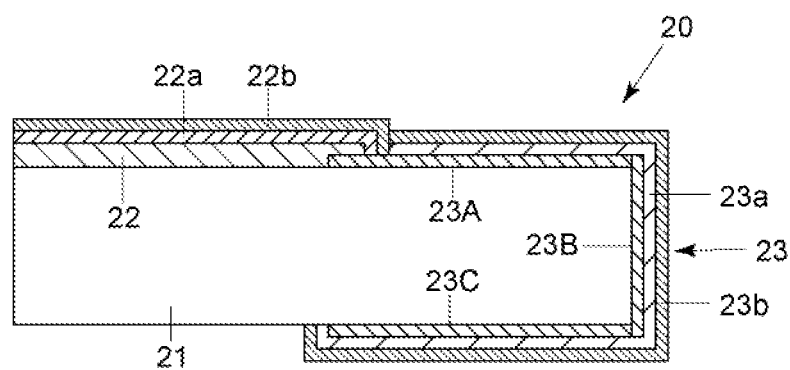
FIG. 3 is a cross sectional view showing a chip resistor built into the above surface-mounted resistor.
Figure 4:
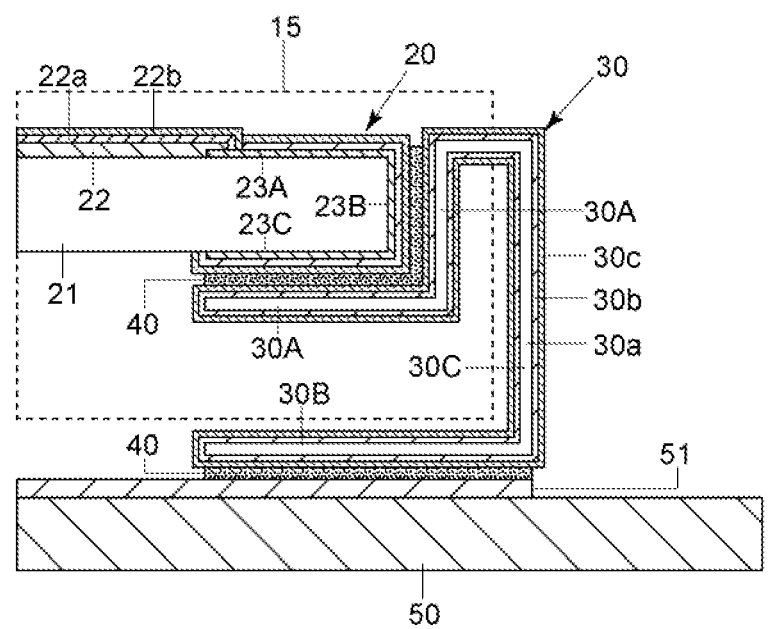
FIG. 4 is a cross sectional view showing a mounting state of the above surface-mounted resistor.

FIG. 1 shows an external shape of a surface-mounted resistor with a built-in chip resistor of a first embodiment. FIG. 2 shows a cross section thereof. FIG. 3 shows a cross section of the mounted chip resistor. FIG. 4 shows a cross section of the surface-mounted resistor with the built-in chip resistor in a mounted state.

As shown in these drawings, in a surface-mounted resistor 10, an entire chip resistor 20 and a part of a lead terminal 30 are covered with a molded resin body 15 which is an exterior member. Therefore, only the part of the lead terminal 30 appears on an outside of the exterior member 15 (see FIG. 1). A lower-surface electrode 23C and an end-surface electrode 23B of the chip resistor 20 are connected and fixed to a chip-resistor-connecting portion 30A of a lead terminal 30 with a solder 40 in the exterior member 15 (see FIG. 2).

The lead terminal 30 includes a lead-terminal-connecting portion 30C, extends from an upper end of the chip-resistorconnecting portion 30A to the outside of the exterior member 15 (i.e., molded resin body), and bends downward. The lead terminal 30 extends along an end surface of the exterior member 15 and below a lower surface of the exterior member 15 (see FIG. 2). Further, the lead terminal 30 includes a printed-substrate-connecting portion 30B, and extends from a lower end of the lead-terminal-connecting portion 30C along the lower surface of the exterior member 15. The lead terminal 30 can be fixed to a wiring layer 51 of a printed substrate 50 with the solder 40 (see FIG. 4).

The chip resistor 20 includes a plate-shaped substrate 21 made of a ceramic material containing alumina as a main component, a resistance body 22 such as a thick film made of ruthenium oxide or the like formed on the upper surface of the substrate, and an electrode 23 connected to the resistance body 22 and drawn from the upper surface of the substrate 21 to the lower surface of the substrate 21 via the end surface. The resistance body 22 is connected to an upper-surface electrode 23A by partially overlapping the upper-surface electrode 23A, and the resistance body 22 is coated with a protective film made of a glass film 22a and a resin film 22b (see FIG. 3).

The electrode 23 of the chip resistor includes the upper-surface electrode 23A which is a thick film made by firing Ag—Pd paste or the like, the end-surface electrode 23B made of a thin film formed by sputtering Ni—Cr, and the lower-surface electrode 23C which is a thick film made by firing Ag paste or the like. A nickel-plated layer 23a and a tin-plated layer 23b are covering and arranged on these electrodes 23A, 23B, and 23C.

The nickel-plated layer 23a prevents metal elements such as Ag from diffusing from an underlying metal layer. The tin-plated layer 23b aims to ensure the wettability of the solder during soldering.

In the plate-shaped lead terminal 30, a nickel-plated layer 30b and a tin-plated layer 30c are plated on a base material 30a made of a highly conductive material such as copper. The nickel-plated layer 30b prevents copper or the like from diffusing from the base material 30a. The tin-plated layer 30c aims to ensure the wettability of the solder during soldering.

The lower-surface electrode 23C and the end-surface electrode 23B of the chip resistor 20 are connected to the resistor-connecting portion 30A composed of a flat portion and a vertical portion of the lead terminal 30 by the solder 40 or the like (see FIG. 2). According to the above connection, both the end-surface electrode 23B and the lower-surface electrode 23C of the chip resistor 20 are connected to the resistor-connecting portion 30A of the L-shaped lead terminal by solder 40 or the like, so that good conductivity can be obtained by connecting a large area, and a connection resistance of the chip resistor can be reduced.

The solder 40 does not protrude from a facing surface between the end-surface electrode 23B and the lower-surface electrode 23C of the chip resistor 20 and the resistor-connecting portion 30A of the lead terminal 30.

The chip-resistor-connecting portion 30A of the lead terminal 30 is connected to the printed-substrate-connecting portion 30B which is a flat portion via the L-shaped connecting portion 30C. The inside of the connecting portion 30C shown by a broken line is a filled portion of the exterior member 15 (i.e., molded resin body). As described above, the entire chip resistor 20 and a part of the lead terminal 30 are embedded and fixed in this filled portion.

A connecting portion composed of the end-surface electrode 23B and the lower-surface electrode 23C of the chip resistor 20 and the solder 40 connecting the resistor-connecting portion 30A of the lead terminal 30 is inside the exterior member 15 (i.e., molded resin body). Therefore, the connection is solid because it is fixed by the molded resin body (see FIG. 2).

Therefore, even if a stress generated by a difference in linear expansion coefficient between a ceramic substrate of the chip resistor and a glass epoxy substrate of the printed substrate by heating is applied when the printed-substrate-connecting portion 30B of the lead terminal 30 is soldered to the wiring layer 51 of the printed substrate 50, the chip resistor 20 and the lead terminal 30 do not come off.

When the printed-substrate-connecting portion 30B of the lead terminal 30 is soldered to the wiring layer 51 of the printed substrate 50, the heat generated by soldering passes through the lead-terminal-connecting-portion 30C to reach the chip-resistor-connecting portion 30A of the lead terminal 30. A part of the lead-terminal-connecting-portion 30C and the entire chip-resistor-connecting portion 30A are located inside the mold resin body 10.

As shown in the drawings, the lead terminal 30 has a long heat transfer path, the heat generated by soldering is attenuated. When the heat enters in the mold resin body 10, the heat is considered to be further attenuated by a heat capacity of the mold resin body 10. Therefore, when the surface-mounted resistor 10 is mounted on the printed substrate 50, the heat generated by soldering or the like is attenuated in a middle and rarely affects a soldered portion between the chip resistor and the lead terminal. Therefore, a joint portion between the chip resistor and the lead terminal does not come off when mounting the surface-mounted resistor.

The chip resistor 20 and the chip-resistor-connecting portion 30A of the lead terminal 30 are firmly fixed by the mold resin body 15. Therefore, even if the printed substrate 50 is placed in an environment where the temperature changes drastically after mounting the chip resistor 20 on the printed substrate 50 or the like via the lead terminal 30, and the stress generated by the difference in linear expansion coefficient between the ceramic substrate of the chip resistor and the glass epoxy substrate of the printed substrate is applied, the stress is absorbed by the long lead terminal 30. Therefore, according to the surface-mounted resistor 10 including the above configuration, it is considered that high reliability can be obtained.

Figure 13:
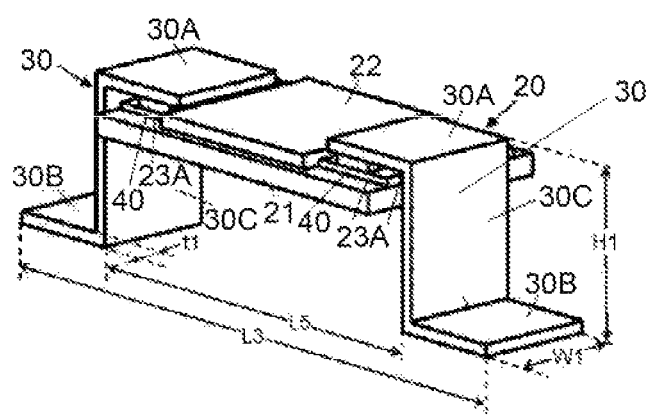
FIG. 13 is a view showing an example of the surface-mounted resistor including a chip resistor of the prior art.

In the prior art shown in FIG. 13, the upper-surface electrode 23A of the chip resistor 20 and the chip-resistor-connecting portion 30A which is an upper side of the lead terminal 30 are connected by the solder 40 or the like. On the other hand, in the embodiment, the plate-shaped lead terminal 30 is not connected to the upper-surface electrode 23A adjacent to the resistance body 22, and is connected to the lower-surface electrode 23C of the ceramic substrate 21.

When the lead terminal is connected to a forming surface of a coating of "the electrode"-"the resistance body"-"the electrode" as in the prior art, there is a concern that the stress may occur somewhere in the coating of "the electrode"-"the resistance body"-"the electrode", and cracks may occur by the difference in linear expansion between the metal lead terminal and the ceramic substrate. In order to solve this problem, in the embodiment the chip resistor has a structure having electrodes on "the upper surface"-"the end surface"-"the lower surface", and has a structure in which the electrodes on the lower-surface side and the lead terminal are connected.

There is no coating between the lower-surface electrodes. Therefore, no stress is generated on an entire coating of "the electrode"-"the resistance body"-"the electrode", and the stress is limited only to the joint portion between the lower-surface electrode and the lead terminal. The stress increases on a center side of the substrate, but even in this case, a continuity between the lead terminal and the electrode can be ensured on an end side of the ceramic substrate. Therefore, it is considered that the reliability is improved by joining the lead terminal 30 with the lower-surface electrode 23C of the chip resistor.

Figure 5:
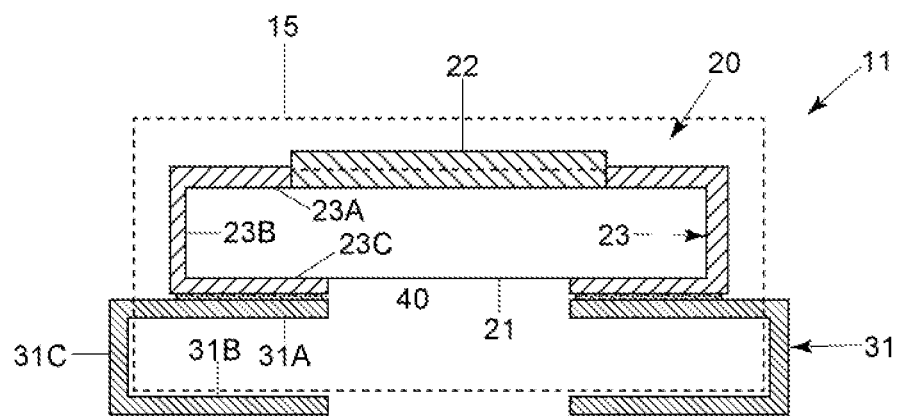
FIG. 5 is a cross sectional view showing the surface-mounted resistor of a second embodiment.

FIG. 5 shows a surface-mounted resistor 11 with the built-in chip resistor according to a second embodiment. In this embodiment, the configurations of the chip resistor 20 and the mold resin body 15 are the same as those in the first embodiment. However, the configuration of the lead terminal 31 is different from that of the lead terminal 30 of the first embodiment.

In this embodiment, the lead terminal 31 includes a flat resistor-connecting portion 31A connected to the electrode 23 of the chip resistor 20, a flat printed-substrate-connecting portion 31B connected to the wiring layer 51 of the printed substrate 50 to be mounted, and an I-shaped lead-terminal-connecting portion 31C for connecting the resistor-connecting portion 31A and the printed-substrate-connecting portion 31B. The lead terminal 31 has an overall U-shape.

The lower-surface electrode 23C of the chip resistor 20 is connected to the flat resistor-connecting portion 31A of the lead terminal 31 by soldering or the like with the solder 40 or the like. The entire chip resistor 20 and most of the lead terminal 31 are sealed by the mold resin body 15. The printed-substrate-connecting portion 31B of the lead terminal 31 is connected to the wiring layer 51 of the printed substrate 50 by soldering or the like.

Therefore, since the I-shaped lead-terminal-connecting portion 31C of the lead terminal 31 is located outside the molded resin body 15, it is possible to absorb the stress generated by the difference in linear expansion coefficient between the ceramic substrate of the chip resistor and the glass epoxy substrate of the printed substrate. A connecting portion between the chip resistor 20 and the lead terminal 31 is inside the molded resin body 15. Therefore, the chip resistor 20 and the lead terminal 30 do not come off even if stress is applied.

Figure 6:
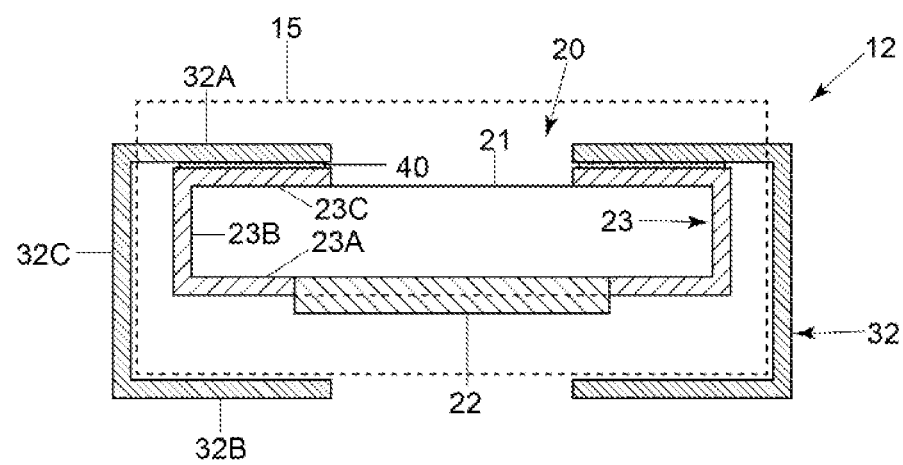
FIG. 6 is a cross sectional view showing the surface-mounted resistor of a third embodiment.

FIG. 6 shows a surface-mounted resistor 12 with a built-in chip resistor according to a third embodiment. In this embodiment, the chip resistor 20, contrary to the second embodiment shown in FIG. 5, is fixed to the lower surface of the chip-resistor-connecting portion 32A by the solder 40 or the like so as to be suspended from the lower surface of the chip-resistor-connecting portion 32A on the upper side of the U-shaped lead terminal 32. The resistance body and its protective film 22 and the upper-surface electrode 23A are arranged on the lower side, and the lower-surface electrode 23C is arranged on the upper side.

The lead terminal 32 includes a chip-resistor-connecting portion 32A on the upper side, a printed-substrate-connecting portion 32B on the lower side, and the I-shaped lead-terminal-connecting portion 32C for connecting these, and has an overall U-shape. The lead terminal 32 is common to the second embodiment described above in these respects. However, as described above, the chip resistor 20 is suspended from the lower surface of the U-shaped chip-resistor-connecting portion 32A on the upper side. Therefore, the lead terminal 32 can be pulled out from the upper part of the mold resin body 15, so that a length of the I-shaped lead-terminal-connecting portion 32C is long.

Therefore, according to this embodiment, in addition to the effects described in the second embodiment, the lead terminal 32 can be pulled out from the upper part of the mold resin body 15, so that there is an advantage that a large solder fillet can be obtained when mounting.

Figure 7A:
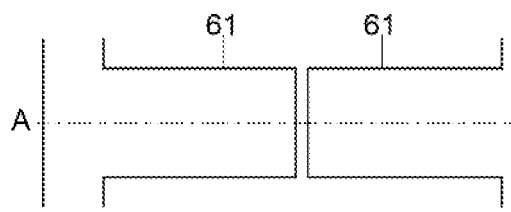
FIG. 7A is a plan view showing a method for manufacturing of the surface-mounted resistor according to an embodiment.
Figure 7B:
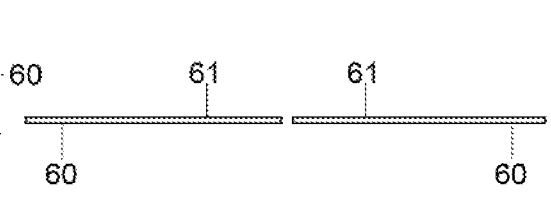
FIG. 7B is a cross sectional view taken along a line AA of FIG. 7A.

A method for manufacturing the surface-mounted resistor of an embodiment will be described with reference to FIGS. 7A to 12. First, a long lead frame 60 is prepared. Then, as shown in FIGS. 7A and 7B, each section of the lead frame is processed into a comb-teeth shape. That is, the comb-shaped portion 61 is formed. The comb-shaped portion 61 becomes a plate-shaped lead terminal at a product stage.

Figure 8A:
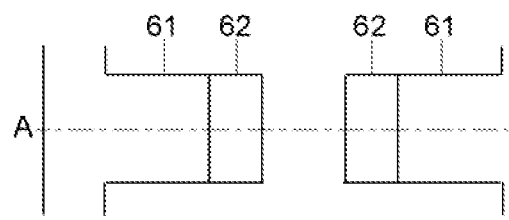
FIGS. 8A and 8B are also views showing a stage of bending a portion for placing the chip resistor.
Figure 8B:
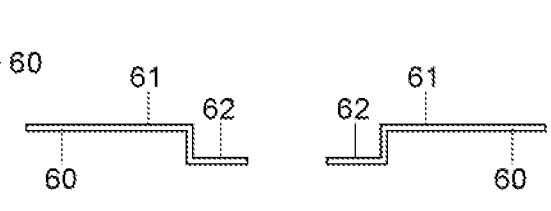

Next, as shown in FIG. 8, the comb-shaped portion 61 is bent to form a portion 62 on which the chip resistor is placed. A distance between the portions 62 and 62 on which the chip resistor is placed is preferably such that the lower-surface electrode and the end-surface electrode of the chip resistor are fitted to the portion.

Figure 9A:
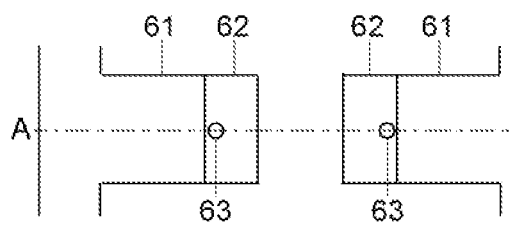
FIGS. 9A and 9B are also views showing a stage of applying a solder.
Figure 9B:
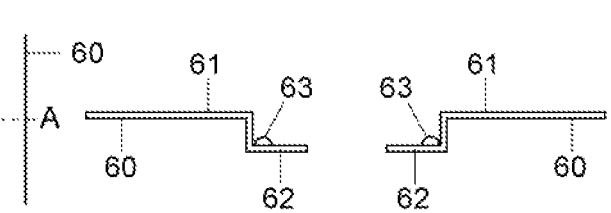

Next, as shown in FIG. 9, a solder material 63 is applied to the portion 62 on which the chip resistor is placed. It is preferable that the solder material wraps around between opposite surfaces of the end-surface electrode and the lower-surface electrode of the chip resistor by applying the coating to the portion where corner portions of the lower-surface electrode and the end-surface electrode of the chip resistor enter. It is also necessary to set an appropriate amount so that it does not protrude from the facing surface between the electrode and the lead terminal of the chip resistor.

Figure 10A:
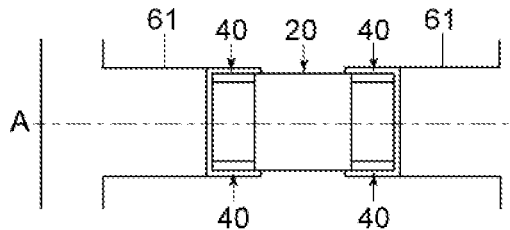
FIGS. 10A and 10B are also views showing a stage of mounting and soldering the chip resistor.
Figure 10B:
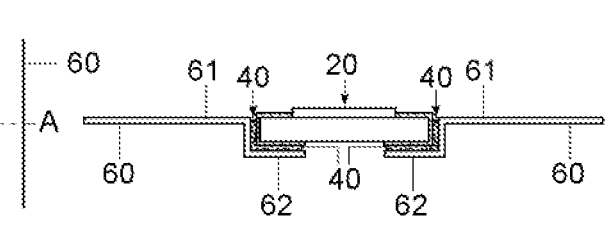

Next, as shown in FIG. 10, the electrode of the chip resistor 20 is placed on the portion coated with the solder material 63 and heated to fix the electrode of the chip resistor 20 with the solder 40. The heating may be put in a heating furnace, or may be heated by a laser or the like.

Figure 11A:
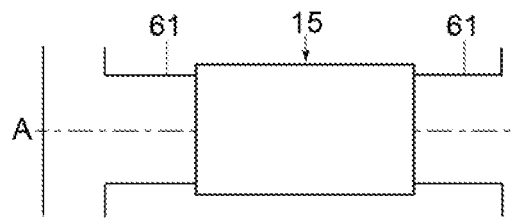
FIGS. 11A and 11B are also views showing a stage of covering exterior member by resin molding.
Figure 11B:
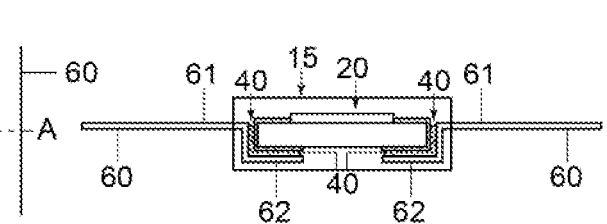

Next, as shown in FIG. 11, the entire chip resistor and a part of the comb-shaped portion of the lead frame are covered with the exterior member 15. Specifically, resin molding is performed to form a molded resin body. Then, in a state where the electrode of the chip resistor and the comb-shaped portion of the lead frame are soldered, the molded resin body is sealed, and the comb-shaped portion 61 of the lead frame extends from an exterior member 15 (mold resin body).

Figure 12A:
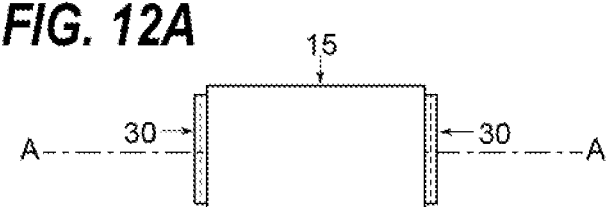
FIG. 12A is a plan view (top view) showing the surface-mounted resistor in a completed stage.
Figure 12B:
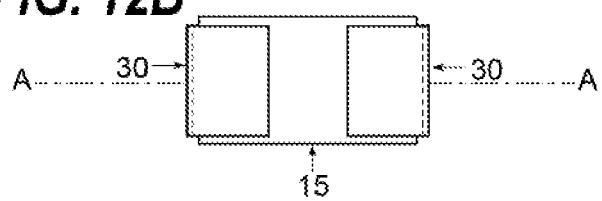
FIG. 12B is a plan view (bottom view) thereof.
Figure 12C:
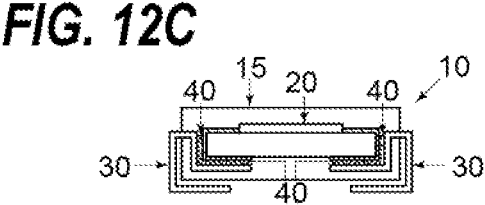
FIG. 12C is a cross sectional view taken along a line AA of FIGS. 12A, 12B.

Next, the comb-shaped portion 61 of the lead frame is cut and bent to form a connecting portion of the printed substrate or the like to be mounted to a wiring layer. As shown in FIG. 12, the comb-shaped portion of the lead frame can be bent along the end surface and the lower surface of the exterior member 15. According to the above steps, a surface-mounted resistor having the shape described in the first embodiment can be obtained.

Although embodiments have been described so far, it goes without saying that the present invention is not limited to the above-described embodiment and may be implemented in various different forms within the scope of the technical idea.

What is claimed is:

1. A surface-mounted resistor comprising:
   a chip resistor comprising a plate-shaped substrate, a resistance body formed on an upper surface of the substrate, and an electrode connected the resistance body and drawn from the upper surface of the substrate to a lower surface of the substrate via an end surface;
   a plate-shaped lead terminal connected to the electrode, the lead terminal comprising a chip-resistor-connecting portion; and
   a molded exterior member,
   wherein the chip-resistor-connecting portion has an L-shape extending along the electrode on the lower surface side and the end surface side of the substrate, and is fixed by an L-shaped solder formed along the electrode on the lower surface side and the end surface side of the substrate, wherein the exterior member covers an entire chip resistor including the electrode on the lower surface side and the end surface side of the substrate, the chip-resistor-connecting portion of the lead terminal, and the solder, and wherein the lead terminal comprises:
- a lead-terminal-connecting portion that extends from the chip-resistor-connecting portion to an outside of the exterior member, and bends downward, and extends along a side surface of the exterior member; and
- a printed-substrate-connecting portion that extends from the lead-terminal-connecting portion to a lower side of the exterior member, bends downward, and extends along a lower surface of the exterior member.

2. The surface-mounted resistor according to claim 1, wherein the solder does not protrude from a facing surface between the electrode and the lead terminal.

3. A method for manufacturing of a surface-mounted resistor comprising:
preparing a lead frame and processing the lead frame into a pair of comb shape to form a comb-teeth portion;
arranging the lead frame so that tip sides of the comb-teeth portion faces inward;
bending the comb-teeth portion to form an L-shaped chip-resistor-connecting portion along an electrode on a lower surface side and an end surface side of a substrate for placing a chip resistor;
applying a solder material to the chip-resistor-connecting portion, and placing the electrode of the chip resistor on the chip-resistor-connecting portion to solder the electrode on the lower surface side and the end surface side of the substrate and the chip-resistor-connecting portion in an L-shape by heating;
covering an entire chip resistor, the chip-resistor-connecting portion of the comb-teeth portion, and the solder with a molded exterior member to protrude a portion of the comb-teeth portion not covered by the exterior member from a side surface of the exterior member;
cutting and bending the comb-teeth portion downward along the side surface of the exterior member to form a portion protruding from the lower surface of the exterior member; and
bending the portion protruding from the lower surface of the exterior member to form a printed-substrate-connecting portion extending along the lower surface of the exterior member.

* * * * *